United States Patent [19]

Bliznak

[11] 3,773,526
[45] Nov. 20, 1973

[54] SACCHARIN SWEETNER COMPOSITION
[75] Inventor: John B. Bliznak, Lombard, Ill.
[73] Assignee: Alberto-Culver Company, Melrose Park, Ill.
[22] Filed: July 6, 1971
[21] Appl. No.: 160,167

[52] U.S. Cl.................. 426/215, 426/217, 426/219
[51] Int. Cl............................................. A23l 1/26
[58] Field of Search .............. 99/28, 78, 141, 141 A

[56] References Cited
UNITED STATES PATENTS
2,876,105  3/1959  Jucaitis et al...................... 99/141 A
3,325,296  6/1967  Braaten............................. 99/141 A Primary Examiner—Raymond N. Jones
Attorney—Sidney Wallenstein et al.

[57] ABSTRACT

Saccharin sweetener compositions in the form of a water-soluble saccharin salt in admixture with a controlled quantity of calcium chloride whereby effectively to reduce the bitter after-taste of said saccharin salt, particularly in admixture with a major proportion of a starch hydrolysate.

7 Claims, No Drawings

SACCHARIN SWEETNER COMPOSITION

This invention relates to improvements in sweetener compositions in which an active sweetener ingredient is a water-soluble salt of saccharin. Such saccharin salts, while long known and used as low-calorie sweeteners, have been characterized by their possessing an unpleasant, generally bitter, after-taste. Various efforts have been made to overcome such objectionable bitter after-taste, as is shown, for instance, in U.S. Pat. Nos. 2,761,783 and 2,782,123.

The present invention is based, in part, on the discovery that the objectionable after-taste of water-soluble salts of saccharin is very effectively reduced by admixing the same with controlled proportions of calcium chloride, namely, from about 0.25 to about 2.5, particularly from about 0.5 to 1.5 to 2, weight parts of calcium chloride per one weight part of the water-soluble salt of saccharin. This effect is particularly surprising because calcium chloride, in itself, has a somewhat bitter taste.

The sweetener compositions of the present invention may be prepared in solid or liquid form, the latter, for instance, in the form of aqueous solutions. The may consist solely of the water-soluble saccharine salt, or mixtures of such salts, and calcium chloride, or there may be incorporated therein various carriers which may, for instance, be present in major proportions; and there may be incorporated supplemental ingredients, in minor or greater proportions, such as edible gums, thickeners, stabilizers, surfactants, preservatives, flow conditioners, and the like. When reference is made in the claims to the compositions consisting essentially of the specified ingredients, it will be understood that this does not exclude the inclusion of carriers or of supplemental ingredients which do not fundamentally change the character of the sweetener compositions of the invention.

Among the water-soluble salts of saccharin which can be used are the sodium, potassium, ammonium and calcium salts, or mixtures thereof. The use of the calcium salt is, however, preferred.

It has also been found that if the water-soluble saccharin salts and the calcium chloride, in the stated proportions to each other, are incorporated into a major proportion of a starch hydrolysate having a D.E. of 0 to 20, and the mixture dried, as by spray drying, the overcoming of the bitter aftertaste of the water-soluble saccharin salt is further enhanced, particularly when the sweetener composition is used for sweetening hot coffee.

It may be pointed out that it is recognized that it has heretofore been known, as shown in U.S Pat. Nos. 3,320,074 and 3,325,296, to employ certain starch hydrolysates in the production of sweetener compositions in which the sweetener is saccharin or cyclamates or mixtures thereof. In the first of these two patents, an aqueous solution of a water-soluble dextrin, having a D.E. of about 0, is subjected to pressure, aerated and then spray dried. In the second of said patents, an aqueous solution of a water-soluble starch hydrolysate, having a D.E. in excess of 13 but not more than 28, and a noncaloric artificial sweetener such as saccharin and/or cyclamates is subjected to vacuum drying as, for instance, on a vacuum drum dryer.

In the practice of that aspect of the present invention in which the water-soluble saccharin salt and the calcium chloride are incorporated into a starch hydrolysate and the resulting mixture is dried, the starch hydrolysates which are utilized are most desirably those which have a D.E. of 0 to 20, particularly 5 to 18. While various starches can be used to make the starting starch hydrolysate, as a practical proposition corn and sorghum starches are most desirable, particularly waxy maize and waxy milo starches. The starch hydrolysate solids content of the aqueous starch hydrolysate solution can be varied but, in general, it is desirably in the range of about 40 to about 60 percent, particularly advantageously about 55 to 58 percent, by weight of said solution. The lower solids concentrations, in the aforesaid range, produce finished dried sweetener compositions having lower bulk densities than those obtained with the higher solids concentrations. The mixture of the starch hydrolysate solution, the water-soluble saccharin salt and the calcium chloride, preferably in a performed aqueous solution, are fed into the preheater or preheaters of the spray drier, where the product is to be spray dried, and then fed therefrom into the spray drier. The exact manner of operating or controlling the spray drier so as to obtain a finished spray dried product is variable, depending upon the exact construction of the drier, temperature controls of inlet and outlet air and other factors which are, per se, well known to the art. In the preheater of the spray drier, the temperature of the mixture to be spray dried is raised, generally quite rapidly, prior to the spraying into the drying chamber. In certain cases, preheating may be avoided but, as a practical proposition, in general, it is especially advantageous to effect preheating and then to effect drying in a spray drier.

While it is especially advantageous that the mixture of the starch hydrolysate, water-soluble saccharin salt and calcium chloride be spray dried, in the broader aspects of the invention other drying equipment can be used such as vacuum drum driers, thin film driers and the like.

In those cases in which a starch hydrolysate is incorporated with the water-soluble saccharin salt and the calcium chloride, the starch hydrolysate constitutes a distinctly major proportion, and the saccharin salt and calcium chloride constitute a distinctly minor proportion of the total solids of the final sweetener composition. The proportions of the saccharin salt and calcium chloride utilized, although always distinctly minor in said starch hydrolysate sweetener compositions, are variable, depending upon the degree of sweetness desired in the final sweetener composition. In general, the saccharin salt will usually fall within the range of about 2 to 6 percent, particularly 3 to 5 percent, by weight of the finished dried sweetener composition, and the calcium chloride will constitute from about 0.5 to 15 percent, with the proviso that the weight ratio of the calcium chloride to the saccharin salt is 0.25 to 2.5 parts of calcium chloride to one part by weight of the saccharin salt. The starch hydrolysate solids will generally constitute from about 83 to 93 percent by weight of the finished dried sweetener composition.

While the nature of the saccharin sweetener compositions with which this invention deals is believed apparent from the disclosures set forth above, the following are examples of illustrative ones of said compositions. All parts stated are by weight.

EXAMPLE 1

Calcium saccharin — 10

Calcium chloride — 5

EXAMPLE 2

Calcium saccharin — 10
Calcium chloride — 20

EXAMPLE 3

Sodium saccharin — 10
Calcium chloride — 15

EXAMPLE 4

Calcium saccharin — 4.5
Calcium chloride — 3.3
Milo starch hydrolysate (D.E. 12 to 13) — 92.2

EXAMPLE 5

Calcium saccharin — 4
Calcium chloride — 2.5
Cornstarch hydrolysate (D.E. 5 to 6) — 93.5

EXAMPLE 6

Calcium saccharin — 5
Calcium chloride — 4
Milo starch hydrolysate (D.E. 12 to 13) — 91

It may be pointed out that it has heretofore been suggested, as disclosed in U.S. Pat. No. 2,876,05, to produce dry low-calorie sweetener compositions in the form of mixtures of certain glucose polymers with cyclamates and/or saccharin, particularly in conjunction with water-soluble cellulose derivatives and surface active agents. The said patent also points out that the flavor of the sweetener compositions of the invention of said patent can be enhanced by adding thereto traces of sodium chloride, calcium chloride or other materials. My invention is sharply distinguishable therefrom in that not only is my invention concerned with overcoming the specific problem of the bitter aftertaste of water-soluble salts of saccharin, as distinguished from generally enhancing the flavor of said saccharin salts, but, further, in the fact that the results achieved by my invention cannot be obtained by the use of traces of calcium chloride. On the contrary, it is essential, to achieve the objectives of my invention, as shown hereinabove, that the calcium chloride be employed in very substantial proportions in relation to the water-soluble salts of the saccharin, namely, from at least about 0.25 and, better still, from at least about 0.5 , to about 2.5 weight parts per one weight part of said saccharin salts.

The sweetening compositions of this invention can be used, and are intended for use, for sweetening beverages, such as hot coffee, tea, soft drinks and carbonated beverages, and for various other food purposes for which low-calorie sweeteners such as saccharin are utilized.

I claim:

1. A sweetener composition consisting essentially of a water-soluble saccharin salt and calcium chloride, the calcium chloride constituting from 0.25 to 2.5 weight parts per one weight part of said saccharin salt.

2. A sweetener composition according to claim 1, in which the saccharin salt is the calcium salt.

3. A sweetener composition according to claim 2, in which the calcium chloride constitutes from 0.5 to 1.5 weight parts per one weight part of the calcium salt of saccharin.

4. A dry sweetener composition comprising a mixture including, by weight, from about 83 to 93 percent of a starch hydrolysate having a D.E. in the range up to about 20, from about 2 to 6 percent of a water-soluble saccharin salt, and from about 0.5 to 15 percent of calcium chloride, the weight ratio of the calcium chloride to the water-soluble saccharin salt being from 0.25 to 2.5 of the calcium chloride to one of the water-soluble saccharin salt.

5. The composition of claim 4, in which the saccharin salt is the calcium salt.

6. The composition of claim 4, in which the starch hydrolysate is a corn starch hydrolysate having a D.E. of about 5 to about 18.

7. The composition of claim 6, in which calcium saccharin comprises about 4.5 percent, the calcium chloride about 3.3 percent, and the starch hydrolysate about 92.2 percent, said percentages being by weight of the dry sweetener composition.

* * * * *